United States Patent

Skinner et al.

[11] Patent Number: 5,709,388
[45] Date of Patent: Jan. 20, 1998

[54] VARIABLE CLEARANCE PACKING RING WITH GUIDE FOR PREVENTING CIRCUMFERENTIAL DISPLACEMENT

[75] Inventors: David Robert Skinner, Pattersonville; Victor John Knorowski, Rexford; Martin Francis O'Connor, Scotia; Richard Jon Chevrette, Cohoes; Thomas William Swart, Niskayuna, all of N.Y.

[73] Assignee: General Electric Co., Schenectady, N.Y.

[21] Appl. No.: 721,655

[22] Filed: Sep. 27, 1996

[51] Int. Cl.⁶ ............................... F16J 15/447
[52] U.S. Cl. ............................... 277/53
[58] Field of Search ............... 277/9, 11, 53, 277/54, 55, 56, 57, 136, 137, 174, 192; 415/229, 230

[56] References Cited

U.S. PATENT DOCUMENTS

| | | | |
|---|---|---|---|
| 2,239,637 | 4/1941 | Zesewitz | 277/56 |
| 2,600,991 | 6/1952 | Hargrove | 277/56 |
| 3,155,395 | 11/1964 | Hoffman | 277/53 |
| 3,642,292 | 2/1972 | Dougherty | 277/56 |
| 4,436,311 | 3/1984 | Brandon | 277/27 |
| 5,374,068 | 12/1994 | Jewett et al. | 277/1 |
| 5,395,124 | 3/1995 | Brandon | 277/53 |
| 5,464,226 | 11/1995 | Dalton | 277/53 |
| 5,487,491 | 1/1996 | Dalton et al. | 277/54 |

FOREIGN PATENT DOCUMENTS 0277806  9/1927  United Kingdom ............ 277/53

Primary Examiner—William A. Cuchlinski, Jr.
Assistant Examiner—John L. Beres
Attorney, Agent, or Firm—Nixon & Vanderhye

[57] ABSTRACT

A rotary machine has a stationary component with circumferential grooves and a rotatable component, as well as annular sealing segments movable toward and away from the rotating component. To prevent circumferential displacement of the lower side annular segments by gravity forces and enable the lowermost segment in the lower housing to be moved radially inwardly, the side segments of the lower housing are supported adjacent the casing midline in a manner preventing downward movement and enabling horizontal movement. Consequently, the gap between the lower ends of the side segments and the lower segment in the open position of the segments remains, enabling the lower segment to move radially inwardly upon closing the seals.

9 Claims, 4 Drawing Sheets

VARIABLE CLEARANCE PACKING RING WITH GUIDE FOR PREVENTING CIRCUMFERENTIAL DISPLACEMENT

TECHNICAL FIELD

The present invention relates to seals between rotating and stationary components of a rotary machine, such as a steam turbine, and particularly relates to positive pressure, variable clearance packing ring segments having guides for preventing circumferential slippage of the segments about the groove of the stationary component and enabling the segments to move toward and away from the rotating component, i.e., between large and small clearance positions relative to the rotating component.

BACKGROUND

In rotary machines such as turbines, seals are provided between rotating and stationary components. For example, in steam turbines, it is customary to employ a plurality of arcuate seal ring segments to form a labyrinth seal about and between the stationary and rotating components. Typically, the arcuate seal ring segments are disposed in an annular groove in the stationary component concentric about the axis of rotation of the machine and hence concentric to the sealing surface of the rotating component. Each arcuate seal segment carries an arcuate seal face in opposition to the sealing surface of the rotating component. In labyrinth-type seals, the seal faces carry a radially directed array of axially spaced teeth and which teeth are radially spaced from an array of axially spaced annular grooves forming the sealing surface of the rotating component. Alternatively, the rotating component may have a smooth surface in radial opposition to the array of teeth on the seal faces. The sealing function is achieved by creating turbulent flow of a working media, for example, steam, as it passes through the relatively tight clearances within the labyrinth defined by the seal face teeth and the opposing surface of the rotating component.

In a typical installation, the annular groove is dovetail-shaped, having locating flanges directed axially toward one another and defining a slot therebetween. The stationary component (e.g., a housing or casing) is typically split lengthwise along a generally horizontal extending midline defining upper and lower halves of the stationary housing. Thus, the semi-annular dovetail grooves receive portions of the arcuate seal ring segments. The seal ring segments are similarly dovetail-shaped, having a pair of flanges directed axially away from one another for disposition within the dovetail groove and a neck which joins the seal face and the flanges of the segment and passes through the slot defined by the locating flanges of the groove. The neck carries the arcuate seal face radially inwardly of the groove when each segment is installed.

In positive pressure, variable clearance type packing rings, the segments are typically spring biased into outer or large clearance positions with the seal faces carried thereby spaced substantially outwardly of the rotary component. Thus, for example, at startup of the machine, the springs displace the segments radially outwardly. After start-up, the working fluid medium, e.g., steam, is inlet to the grooves of the stationary component, biasing the segments for movement inwardly against the bias of the springs toward the inner or small clearance positions. It will be appreciated that when the segments are retracted to their large clearance positions during startup and turbine shutdown by the springs, the gaps between the end faces of adjoining segments become increasingly greater. Conversely, when the segments are displaced inwardly, the gaps between the end faces of the segments decrease substantially to a fully-closed position when the segments obtain their smallest diameter. To accommodate the inward and outward movement of the segments, the segments are disposed within the grooves of the stationary component in a sliding or piston-fit arrangement.

It has been found that when the rotary machine (e.g., steam turbine) is at rest, for example, prior to startup, the segments, lying in their largest radially outward position, have been observed to slide along the circumferential groove of the stationary component in a downward direction under the action of gravity forces. As a consequence, an accumulation of clearances between the end faces of the segments appears in the upper housing, while the lower segments become closer, i.e., butting end-to-end. For example, where six segments are employed in a rotary machine, three segments are typically disposed in the upper housing of the stationary casing and three segments are disposed in the lower housing, i.e., respectively above and below the horizontal midline or splitline of the machine casing. Prior to startup, the side segments in the upper housing and the side segments of the lower housing may slide under the action of gravity forces such that the side segments of the lower housing engage the lowermost central segment in the lower housing of the machine, with the accumulated clearance between the end faces appearing between the uppermost segment in the upper housing and one or both of the side segments of the upper housing.

Upon startup, the segments are designed to move under fluid pressure from their radially outward positions to their radially inward positions. Because of the effect of gravity, the segments tend to move in sequence. First, the top segment moves radially inwardly, followed by the side segments of the upper housing. The side segments of the lower housing then move radially inwardly, followed by the lowermost segment. It has been found, however, that because the segments become displaced circumferentially about the groove of the stationary component by gravity forces, the inward movement of the side segments of the lower housing of the stationary component, essentially in an upward radial direction, precludes or blocks radial inward movement of the lowermost segment. That is, the fluid pressure forces tending to displace the lowermost segment radially inwardly are insufficient to displace the lower side segments in a generally upward circumferential direction to enable the lowermost segment to move into its radially innermost position. Consequently, the lowermost segment remains radially displaced from its designed radially inward position resulting in a larger than desired clearance between its sealing face and the rotary component.

Previously, attempts have been made to accommodate the gravity forces acting on seal segments. See, for example, U.S. Pat. Nos. 5,464,226 and 5,395,124. In the latter patent, so-called gravity springs are disposed in the stationary component to apply an upward biasing force to the seal segments in the lower housing. These gravity springs engage the seal segments intermediate their ends and at their centers of gravity. The seal segments, moreover, are provided with circumferential springs between the adjoining end faces, as well as between the end faces adjacent the horizontal midline. Anti-rotation keys are fixed to the upper and lower housing at the casing midline, the circumferential springs bearing against the anti-rotation keys. Consequently, the seal segments are biased outwardly by the springs between the segment ends and inwardly by fluid pressure forces. When the seal segments move inwardly, the gravity springs function such that the segments have little or no weight, permitting closure of the lower seal segments to the inner position. Thus, the lower seal segments are said to float by virtue of their opposing circumferential and gravity spring forces and such segments move radially inwardly and outwardly. Also, the end circumferential springs bearing against the anti-rotation keys bias the lower seal segments for circumferential displacement within the grooves in contrast to the present invention wherein circumferential displacement of the lower side segments is positively prevented and horizontal, rather than radial, movement of the lower side segments between inner and outer positions is provided.

DISCLOSURE OF THE INVENTION

In accordance with the present invention, each of the side segments in the lower housing of the casing is provided with a guide which supports the segment, prevents the segment from circumferential displacement under gravity forces, and enables the segment to slide horizontally between outer large and inner small clearance positions, respectively. In a preferred form, each guide comprises an angle bracket, one leg of which is secured to the outer face of the segment adjacent the end of the segment near the midline of the rotary machine. The generally horizontally projecting other leg of the bracket is received in a recess formed in the interior surface of the stationary component and rests on a stop carried by the stationary component. The stops prevent downward circumferential displacement of the side segments in the groove of the lower housing of the rotary machine and thereby maintain clearance between the butt ends of adjacent packing segments.

The bracket also supports the side segments of the lower housing of the machine for movement in a generally horizontal direction toward and away from a vertical plane through the axis of the machine. Thus, each side segment moves as a unit horizontally toward and away from the rotary component. By enabling horizontal displacement of the lower side segments and not radial displacement, it will be appreciated that the clearances between the rotary component and the seal faces of the lower side segments at opposite ends thereof is slightly different. However, this difference is not sufficient to deleteriously affect the integrity of the labyrinth seal along the lower sides of the machine. Beneficially, however, the prevention of the circumferential displacement of the lower side segments under gravity forces enables the lowermost segment of the lower housing for displacement radially inwardly, e.g., upwardly, to its designed radially innermost position after startup.

In a preferred embodiment according to the present invention, there is provided apparatus for preventing circumferential displacement of a segment disposed in a stationary component of a rotary machine having a component rotatable about an axis, the stationary component having an annular groove about the axis, at least one axially directed locating flange about the axis and in part defining a slot opening into the groove, and a stop, the apparatus comprising a segment body for forming one of a plurality of annular segments about the axis of the machine and for partial disposition in the groove of the stationary component, the segment body having an arcuate seal face, at least one axially directed flange for disposition in the groove and a neck portion receivable in the slot and interconnecting the flange and the seal face and a member carried by the segment body and projecting generally outwardly thereof for engagement with the stop carried by the stationary component for preventing circumferential displacement of the segment body about the groove.

In a further preferred embodiment according to the present invention, there is provided a rotary machine comprising a component rotatable about an axis, a stationary component including an annular groove about the axis, the stationary component having at least one axially directed locating flange about the axis and in part defining a slot opening into the groove, a plurality of generally annular segments about the axis, each segment having an arcuate seal face, at least one axially directed flange disposed in the groove and a neck portion in the slot and interconnecting the flange and the seal face, certain of the plurality of segments being movable between radial outward and radial inward positions relative to the axis, a member engaging between the stationary component and each of a pair of the plurality of segments on respective opposite sides of the stationary component for supporting the pair of segments for movement generally horizontally toward and away from a vertical plane through the axis between inner and outer positions, respectively, the pair of segments comprising different ones of the plurality of segments than the certain segments.

In a still further preferred embodiment according to the present invention, there is provided a rotary machine comprising a component rotatable about an axis, a stationary component including an annular groove about the axis, the stationary component comprising upper and lower housings joined to one another along a generally horizontal midline of the stationary component, the stationary component having a pair of axially directed locating flanges about the axis and extending axially toward one another, the flanges defining a slot opening into the groove, a plurality of generally annular segments about the axis, each segment having an arcuate seal face, a pair of flanges disposed in the groove and extending axially away from one another and a neck portion in the slot and interconnecting the segment flanges and the seal faces, at least three of the plurality of segments being disposed in each of the upper and lower housings and forming a circumferentially extending seal ring about the rotatable component, the segments being movable between outward large and inward small clearance positions relative to the rotatable component, a member engaging between the lower housing and each of a pair of the segments on respective opposite sides of the lower housing for supporting the pair of segments against displacement in the groove in a circumferential direction under gravity forces and for movement generally horizontally toward and away from a vertical plane through the axis and between inward and outward positions, respectively.

Accordingly, it is a primary object of the present invention to provide a novel and improved rotary machine having stationary and rotating components wherein annular seal segments about the stationary component are prevented from circumferential displacement due to gravity forces, thereby enabling the segments to close about the rotary component effecting the seal, rather than binding up and preventing seal closure.

BEST MODE FOR CARRYING OUT THE INVENTION

Figure 1:
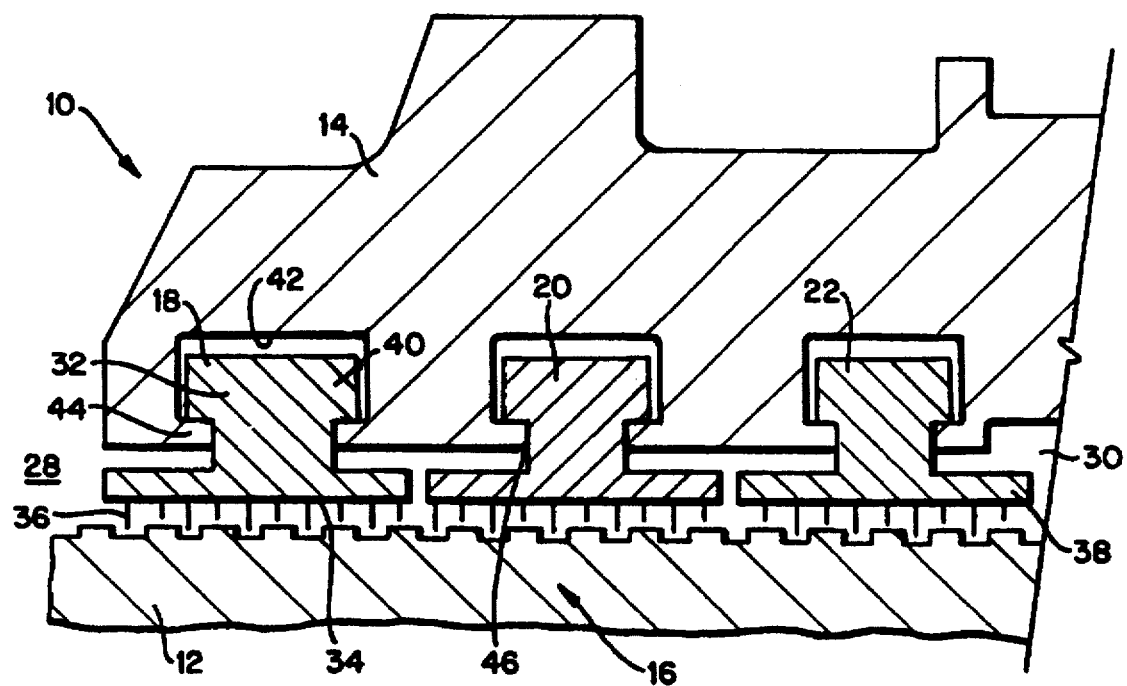
FIG. 1 is a fragmentary cross-sectional view of a portion of a rotary machine, for example, a steam turbine, looking transversely of the axis thereof and illustrating a labyrinth seal.
Figure 3:
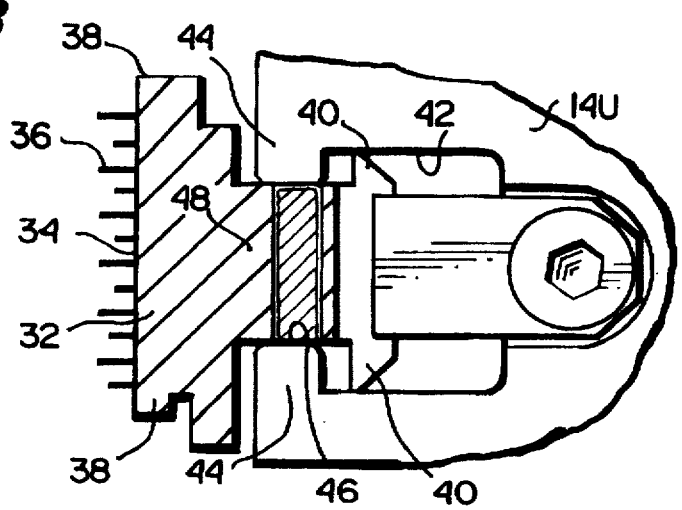
FIG. 3 is a cross-sectional view thereof taken generally about on line 3—3 in FIG. 2.

Referring now to drawing FIG. 1, there is illustrated a portion of a rotary machine, for example, a steam turbine, generally designated 10, having a rotary component, e.g., a turbine shaft 12, disposed in a stationary component, e.g., a turbine housing 14 and which shaft 12 is supported for rotation by conventional means, not shown, within turbine housing 14. A multi-stage labyrinth seal 16 including a plurality of seal rings 18, 20 and 22 are disposed about turbine shaft 12, separating high and low pressure regions 28 and 30, respectively. Each seal ring is formed of an annular array of a plurality of arcuate seal segments 32. In general, labyrinth seal 16 functions by placing a relatively large number of partial barriers to the flow of steam from the high pressure region 28 to the low pressure region 30. Each barrier forces steam attempting to flow parallel to the axis of turbine shaft 12 to follow a tortuous path whereby a pressure drop is created. As best illustrated, for example, in FIG. 3, each seal ring segment 32 thus has a sealing face 34 with projecting radial teeth 36. The sealing face 34 is formed by a pair of flanges 38 extending axially away from one another, although it will be appreciated that only one such flange 38 is necessary in certain applications. The outer portions of the seal ring segments 32 include locating hooks or flanges 40 which similarly extend from segment 32 in axially opposite directions away from one another. As illustrated in FIG. 3, the stationary component, i.e., turbine housing 14, has a generally dovetail-shaped annular groove 42 at each axial location of the seal. The annular groove 42 is located along radially innermost portions of the housing 14 by a pair of locating flanges 44 which extend axially toward one another defining a slot 46 therebetween. A neck 48 of each segment 32 interconnects the locating flanges or hooks 40 and the sealing face 34 and extends through the slot 46.

It will be appreciated that the segments 32 preferably comprise positive pressure, variable clearance packing ring segments movable between open outermost large clearance and closed innermost small clearance positions about the rotary component, e.g., the turbine shaft, at startup and at speed operations, respectively. The segments are moved to their open outermost largest diameter positions by springs, not shown, disposed between the locating flanges or hooks 40 of the segments and the locating flanges 44 of the stationary component 14. To displace the segments into their closed smaller diameter position, a plurality of passages, not shown, are provided in the stationary component or segments to introduce the flowing medium, for example, steam, in the groove 42 and along the outer face of the segments whereby the segments may be displaced inwardly toward the rotary component against the bias of the springs. This type of positive pressure variable clearance packing ring segment is conventional in the art, for example, as described and illustrated in U.S. Pat. No. 5,374,068 of common assignee herewith, the disclosure of which patent is incorporated herein by reference.

Figure 2:
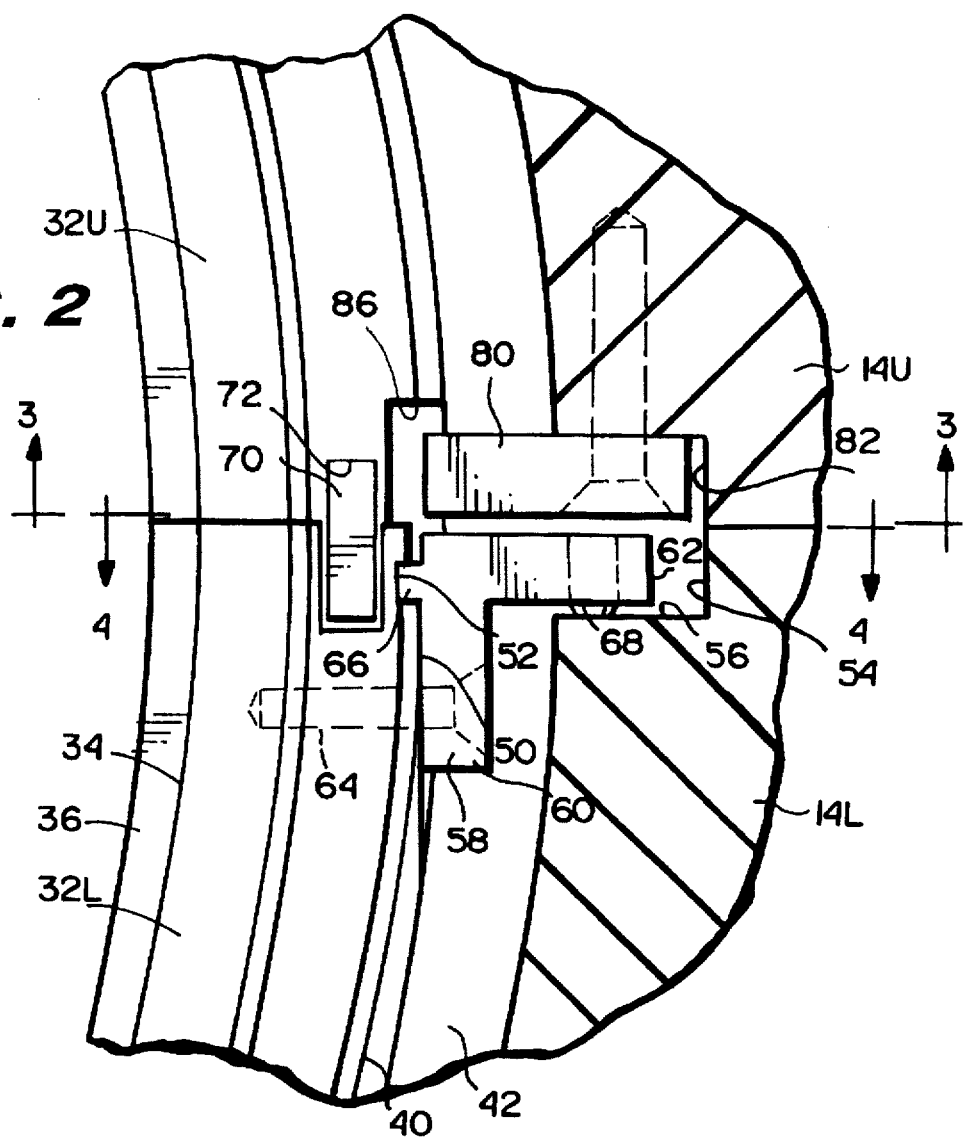
FIG. 2 is an enlarged fragmentary cross-sectional view taken axially along a midline and one side of the rotary machine illustrating adjoining upper and lower ends of the side segments in the lower and upper housings of the stationary component of the rotary machine, respectively.
Figure 4:
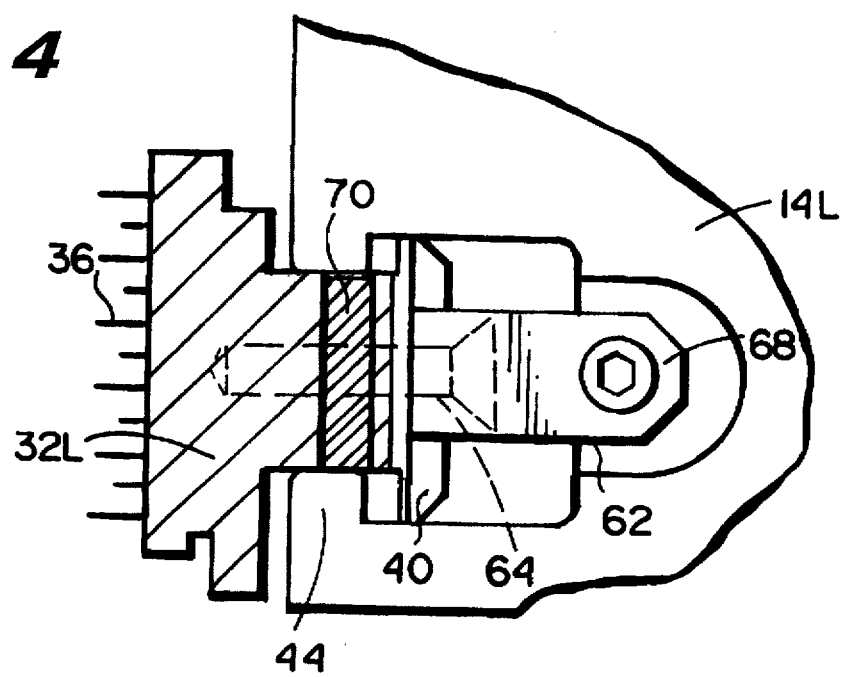
FIG. 4 is a cross-sectional view thereof taken generally about on line 4—4 in FIG. 2.
Figure 5:
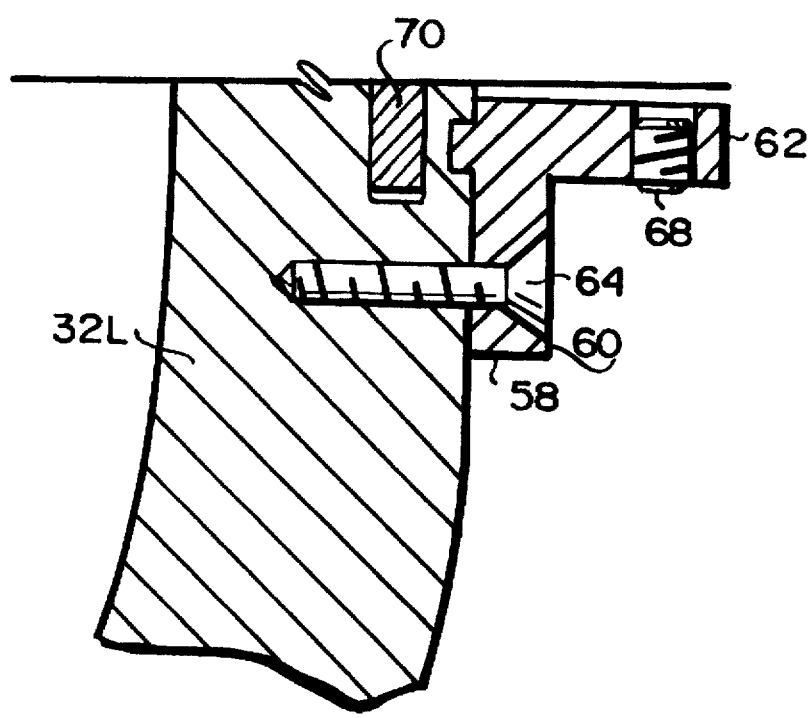
FIG. 5 is a view similar to FIG. 2 but illustrating only the lower segment and the segment guide therefor.

Referring now to FIGS. 2, 4 and 5, the upper and lower ends of the side segments 32L and 32U are illustrated in conjunction with the upper and lower housings 14U and 14L, respectively, of the casing. To support the lower side segments 32L against circumferential displacement under gravity forces when in their open positions relative to the rotary component, the outer face of each segment 32L between the locating hooks 40 and adjacent its upper end is provided with a flat 50 and a recess 52. Additionally, a groove 54 is formed along the inner surface of the stationary component 14L adjacent the midline of the housings 14U and 14L and which groove forms a stop or a ledge 56. A support member 58 engages between the segment 32L and the lower housing of the stationary component. In a preferred embodiment hereof, the support member comprises an angle bracket having right angularly related legs 60 and 62. The leg 60 receives a bolt 64 for securing the bracket 60 to the upper end of the lowermost segment 32L. A projection 66 along the inner face of the leg 60 engages in the recess 52 of the segment 32L to stabilize the bracket. The other leg 62 of the bracket 60 has an adjustable set screw 68 which extends below the lower surface of leg 62 for engagement on stop 56. It will be appreciated from the foregoing and a review of FIG. 2 that the brackets 58 thus support the entirety of the segments 32L against downward circumferential displacement within the groove 42 along opposite sides of the lower housing 14L. Set screw 68 compensates for the normal manufacturing tolerances whereby the various segments 32 may not all be of exactly the same length.

Each bracket 58, however, is disposed to enable horizontal sliding movement of the associated segment 32L in relation to the rotary component, i.e., the rotor of the turbine. Thus, the segments 32L on the opposite sides of the lower housing 14L move horizontally toward and away from a vertical plane through the axis of the shaft between their innermost smallest clearance and outermost largest clearance positions, respectively. The displacement of bracket 58, however, is horizontal, not radial. It is a horizontal movement in contrast to the radial direction of movement of the remaining segments about the stationary component in both the upper and lower housings of the stationary component.

As illustrated in FIG. 2, the end faces of the upper and lower side segments 32U and 32L abut one another. A tongue 70 is received in a slot 72 formed in the opposed end faces and maintains the segments 32U and 32L in substantial circumferential alignment with one another. In view of clearance provided between the slot and tongue in the segment 32L, and depending on the coefficients of friction of the materials forming the segments and the tongue, the motion of segments 32U may have a minor horizontal component of travel.

Also as illustrated in FIG. 2, a plate 80 is secured in a matching recess 82 formed along the interior surface of the upper housing 14U at each substantially diametrically opposed side of the upper housing 14U adjacent the midline. The plate 80 is secured by a bolt and projects inwardly to reside in a slot 86 formed along the lower end of the upper side segment 32U. The plate 80 is conventional in this type of packing ring and is engaged by the side segments 32U upon removal of the upper housing 14U, thus preventing the segments in the upper housing of the stationary component from falling out when the upper housing is removed from the lower housing.

Figure 6:
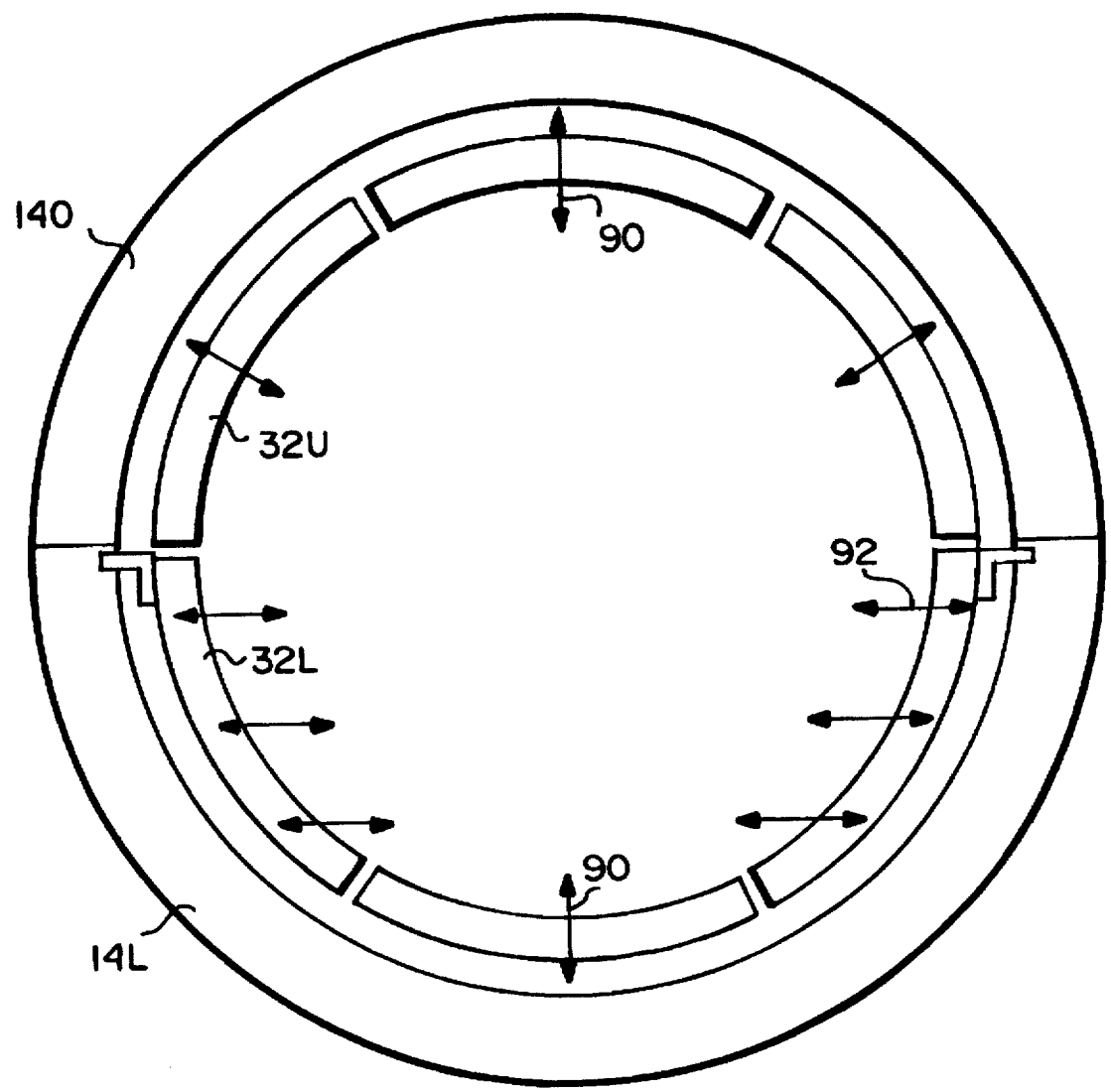
FIG. 6 is a schematic illustration of the directions of movement of the segments of a rotary machine according to the present invention.

Referring now to FIG. 6, the segments 32U and 32L are illustrated in the upper and lower housings 14U and 14L. As illustrated in that figure, six segments are shown, with three segments in the upper housing 14U and three segments in the lower housing 14L. Previous to the present invention, the segments 32 would theoretically all move radially inwardly and outwardly between closed and open positions, respectively, about the shaft. However, because the segments may be displaced by gravity during shutdown prior to startup or during transition, it has been discovered that the segments and particularly the lowermost segment in the lower housing 14L may not move inwardly to its closed position. As explained previously, this is caused by the segments slipping circumferentially downwardly in the grooves under gravity forces, with the gap between the segments accumulating in the upper housing 14U and substantially no gaps appearing in the lower housing 14L when the segments lie in the open position. To prevent that, the brackets 58 are provided for supporting the side segments 32L of the lower housing 14L against downward displacement in the grooves due to gravity, while simultaneously those segments are enabled for movement between closed and open positions relative to the rotating shaft. The radial directions of movement of the upper segments, as well as the lowermost segment in accordance with the present invention, are indicated by the arrows 90. The side segments 32L of the lower housing 14L, however, move horizontally, as indicated by the arrows 92. As previously noted, there may also be some small horizontal component of motion in segments 32U. While this horizontal movement of the side segments 32L causes a slight lack of concentricity of the seal faces of the segments about the shaft in their closed positions, i.e., the upper end of the side segments 32L lie closer to the rotating shaft than their lower ends, this arrangement enables the lower segment of the lower housing 14L to move radially inwardly and outwardly similarly as the upper segments 32U.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for preventing circumferential displacement of a segment disposed in a stationary component of a rotary machine having a component rotatable about an axis, the stationary component having an annular groove about the axis, at least one axially directed locating flange about the axis and in part defining a slot opening into the groove, and a stop, said apparatus comprising:

a segment body for forming one of a plurality of annular segments about the axis of the machine and for partial disposition in the groove of the stationary component;

said segment body having an arcuate seal face, at least one axially directed flange for disposition in the groove and a neck portion receivable in the slot and interconnecting said flange and said seal face; and a member carried by said segment body and projecting generally outwardly thereof for engagement with the stop carried by the stationary component for preventing circumferential displacement of the segment body about the groove;

wherein said member comprises a bracket secured to an outer face of said segment body and having a portion of said bracket projecting outwardly of said segment body for slidable engagement with and support by the stationary component; and wherein an outer face of said segment body is arcuate from end to end, said segment body having a flat along said outer face, said bracket having a leg thereof secured to said segment body against said flat thereof and another leg projecting outwardly of said segment body.

2. A rotary machine comprising:

a component rotatable about an axis;

a stationary component including an annular groove about said axis;

said stationary component having at least one axially directed locating flange about said axis and in part defining a slot opening into said groove;

a plurality of generally annular segments about said axis, each segment having an arcuate seal face, at least one axially directed flange disposed in said groove and a neck portion in said slot and interconnecting said flange and said seal face;

certain of said plurality of segments being movable between radial outward and radial inward positions relative to said axis;

a member engaging between said stationary component and each of a pair of said plurality of segments on respective opposite sides of said stationary component for supporting said pair of segments for movement generally horizontally toward and away from a vertical plane through said axis between inner and outer positions, respectively, and fixing said pair of segments against vertical downward movement, said pair of segments comprising different ones of said plurality of segments than said certain segments;

wherein said stationary component comprises upper and lower housings of the machine joined together at a horizontal midline, said pair of segments being disposed in said lower housing of said stationary component and straddling another segment of said plurality of segments in said lower housing whereby each said member maintains a gap between the lower end of one of said pair of segments and an opposite end of said another segment when said certain segments lie in said radially outward positions and said pair of segments lie in said outer positions.

3. A machine according to claim 2 wherein each said member comprises a bracket secured to an outer face of one of said pair of segments and having a support element projecting outwardly one of said pair of segments, said stationary component having a recess for receiving and supporting said support element, said support element being slidable in generally horizontal directions relative to said rotatable component.

4. A machine according to claim 2 wherein each segment of said pair of segments thereof has a flat along an outer face thereof, an angle bracket having one leg thereof secured to said flat and another leg projecting outwardly of each said segment to which the angled bracket is secured, said stationary component having a recess for receiving and supporting said another leg, said another leg being slidable generally horizontally relative to said recess toward and away from said vertical plane.

5. A rotary machine comprising:

a component rotatable about an axis;

a stationary component including an annular groove about said axis, said stationary component comprising upper and lower housings joined to one another along a generally horizontal midline of said stationary component;

said stationary component having a pair of axially directed locating flanges about said axis and extending axially toward one another, said flanges defining a slot opening into said groove;

a plurality of generally annular segments about said axis, each segment having an arcuate seal face, a pair of flanges disposed in said groove and extending axially away from one another and a neck portion in said slot and interconnecting said segment flanges and said seal faces;

at least three of said plurality of segments being disposed in each of said upper and lower housings and forming a circumferentially extending seal ring about said rotatable component, said segments being movable between outward large and inward small clearance positions relative to said rotatable component; and a member engaging between said lower housing and each of a pair of said segments on respective opposite sides of said lower housing for supporting said pair of segments against displacement in said groove in a circumferential direction under gravity forces and for movement generally horizontally toward and away from a vertical plane through said axis and between inward and outward positions, respectively.

6. A machine according to claim 5, wherein each said member comprises a bracket secured to an outer face of one of said pair of segments and having a support element projecting outwardly of said one of said pair of segments, said lower housing having a stop for supporting said support element, said support element being slidable in generally horizontal directions relative to said rotatably component.

7. A machine according to claim 5 wherein said members are located adjacent upper ends of said pair of segments and upper sides of said lower housing adjacent said midline.

8. A machine according to claim 5 wherein each of said pair of segments has a flat along an outer face thereof, an angle bracket having one leg thereof secured to said flat and another leg projecting outwardly of said pair of segments to which the angle bracket is secured, said lower housing having a recess for receiving and supporting said another leg, said another leg being slidable generally horizontally relative to said recess toward and away from said vertical plane.

9. A machine according to claim 5 including an adjusting element cooperable between each said member and said lower housing for adjusting the circumferential location of said pair of segments within said groove.

* * * * *